United States Patent Office 3,575,886
Patented Apr. 20, 1971

3,575,886
CATALYST AND OXIDATION OF OLEFINS
Louis E. Trapasso, Westfield, N.J., and John D. Wenrick, Cuyahoga Falls, Ohio, assignors to The B. F. Goodrich Company, New York, N.Y.
No Drawing. Original application June 28, 1966, Ser. No. 561,043, now Patent No. 3,497,553, dated Feb. 24, 1970. Divided and this application July 25, 1969, Ser. No. 869,417
Int. Cl. B01j *11/74*
U.S. Cl. 252—439          2 Claims

ABSTRACT OF THE DISCLOSURE

A catalyst for oxidizing olefins to produce unsaturated aldehydes and monocarboxylic acids which comprises oxides of nickel, chromium, molybdenum and tellurium in a molar ratio of 0.5–5 nickel, 0.5–2 chromium, 0.5–4 tellurium and molybdenum in an amount such that the ratio of nickel to molybdenum is from 0.1 to less than 1.

---

This application is a division of application Ser. No. 561,043, filed June 28, 1966 and now U.S. Pat. No. 3,497,553.

This invention relates to new and useful catalysts and to a method of preparing unsaturated aldehydes and unsaturated carboxylic acids by oxidation of unsaturated hydrocarbons at an elevated temperature, and relates more particularly to catalysts comprising a mixture of nickel oxide, chromium oxide, molybdenum oxide and tellurium oxide in molar ratios of 0.5–5 nickel oxide, 0.5–2 chromium oxide, 0.5–4 tellurium oxide and molybdenum oxide in amount so that the mol ratio of $Ni/Mo$ is less than 1, but above 0.1, and to a method of preparing acrolein and acrylic acid, or methacrolein and methacrylic acid, by passing vapors of propylene or isobutylene and an oxygen containing gas over the catalyst at a temperature of from about 300° C. to about 550° C.

These catalysts have long life and convert a substantial amount, more than 50% per pass, of a gaseous monoolefin such as propylene or isobutylene to yield very high proportions of acrolein and acrylic acid, or methacrolein and methacrylic acid. The catalysts produce a wide ratio of olefinic aldehyde to monoolefinically unsaturated carboxylic acid by controllable changes in reaction conditions or catalyst composition. Mol percent efficiencies of about 60 for the aldehyde and about 30 for the unsaturated carboxylic acid have been obtained with the catalyst and process of this invention. Usually when the efficiency for conversion of the hydrocarbon to aldehyde is high the efficiency for the conversion to acid is low and vice versa. This provides a degree of flexibility in the process, so as to provide means for obtaining a product mix that is needed at any particular time during commercial operation. Acrolein is also readily converted to acrylic acid with the catalysts of this invention at efficiencies greater than 50%.

The primary reactants are propylene or isobutylene and an oxygen containing gas, which can be pure oxygen, oxygen diluted with an inert gas, oxygen enriched air or air without additional oxygen. For reasons of economy, air is the preferred oxygen containing reactant.

For the purpose of this invention the hydrocarbons which are oxidized can be defined generically by the formula

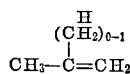

wherein the end products formed result from the oxidation of only one methyl group on the hydrocarbon molecule while the terminal $CH_2=C<$ remains intact.

Stoichiometric ratios of oxygen to olefin are 1.5 to 1. Slightly lower amounts of oxygen can be used at a sacrifice of yield. It is perferred, however, to use 33 to 66% excess oxygen. Mol ratios of 1.5–4 of oxygen to olefin covers a useful range. Larger excesses do not impair the yields of aldehydes and acids, but for practical considerations an excess much above 100% provided in air would require extremely large equipment for a given production capacity.

The addition of steam into the reactor along with the hydrocarbon and oxygen containing gas is desirable but not absolutely essential. Other diluent gases can be used. Surprisingly, saturated hydrocarbons such as propane are rather inert under the reaction conditions. Nitrogen, argon, krypton or other known inert gases can be used as diluents if desired.

The molar ratio of steam to propylene or isobutylene can range from 0 to about 5 to 7. Good results are obtained with molar ratios of about 3 to 5 per mol of olefin and for this reason are preferred.

There are several methods for the preparation of the catalyst, which can be supported or unsupported. It is possible to dissolve each of the starting ingredients in water and combine them from the aqueous solutions or the ingredients can be dry blended. Because of the more uniform blend obtained by the solution procedure, it is preferred.

A general procedure for preparing a catalyst from water soluble ingredients is to dissolve the requiste amounts of a nickel salt and chromium salt in water and mix in ammonium molybdate solution with the Ni-Cr salt solution. Pulverized $TeO_2$ is added to this mixture which is heated to dryness and baked at 400° C. for about 16 hours.

Alternatively a slurry of the catalyst ingredients can be prepared in water, then dried and baked. For supported catalysts the aqueous slurry of the catalyst ingredients can be added to an aqueous suspension of the support or vice versa, and then dried and baked.

A specific example of the solution method is as follows:

(a) Dissolve 218.1 g. of $Ni(NO_3)_2 \cdot 6H_2O$ in 150 ml. of distilled water.

(b) Dissolve 150.1 g. $Cr(NO_3)_3 \cdot 9H_2O$ in 100 ml. of water.

Mix the nickel salt solution and chromium salt solution.

(c) Dissolve 330 g. ammonium molybdate in 440 ml. of water and add this mixture slowly to the Ni-Cr salt solution with stirring. Then add 29.9 grams of pulverized $TeO_2$.

Dry the resulting paste in a vacuum oven at 100° C. and bake for 16 hours at 400° C. Thereafter, the catalyst is ground to the desired mesh size and sieved. This catalyst has the following atomic proportions 2 Ni–1 Cr–0.5 Te–5 Mo. For supported catalysts an aqueous slurry of the support can be added to the catalyst ingredients, or vice versa, prior to drying and baking.

A supported catalyst is prepared by adding to the mixture of Ni-Cr salts 375 grams of an aqueous colloidal dispersion of microspheroidal silica in a concentration of 30–35% $SiO_2$ (Ludox H.S.). The silica may also be added to one of the individual ingredients or the whole mixture added to the silica dispersion.

Among the suitable supports are silica, silica-containing materials, such as diatomaceous earth, kieselguhr, silicon carbide, clay and aluminum oxides.

While the proportion of catalyst components may be varied within the ranges of about 0.5 to 5 of nickel, 0.5 to 2 chromium, 0.5 to 4 tellurium and molybdenum in atomic ratios so that the ratio of nickel to molybdenum is less than one, i.e. 0.1 to 0.9, the following effect of variations has been observed. A decrease in the mol fraction of tellurium calculated as tellurium oxide results in an increase in the yield of acrylic acid and a decrease in the yield of acrolein, vice versa, as the amount of tellurium oxide in the catalyst is increased the yield of acrolein is increased, if this is desired. An increase in the mol fraction of nickel results in an increase in the yield of acrylic acid. Optimum acrylic acid is obtained when the nickel to molybdenum atomic ratio, or molar ratio in terms of the oxide, is less than one, an excess of nickel over an atomic ratio of one results in a reduction in olefin conversion and high yields of carbon dioxide. While the catalyst has been described in terms of metal oxides and can be prepared by mixing the oxides, the actual catalytic state during the course of reaction is not completely understood and it is probable that the actual catalytic agent is the compound nickel chromomolybdate containing $TeO_2$. In terms of the oxides, a preferred molar ratio would be in the range of about 1:4 nickel oxide, 0.5:1 chromium oxide, 0.5:2 tellurium oxide, and 4:6 molybdenum oxide.

The reaction can be carried out in either a fixed or fluidized catalyst bed. The reaction temperature can range from about 300 to 500° C. for the oxidation of propylene but the preferred range is from about 350 to about 450° C. The particle size of catalyst for fixed bed operations used is from 10–18 mesh. As is known, for fixed beds, the size may be of a wider range particle size. For fluid bed systems the catalyst size should be from 80–325 mesh (U.S. sieve).

The contact time can vary considerably in the range of about 2 to 70 seconds. Best results are obtained in a range of about 8 to 54 seconds and this range is preferred. Longer contact times usually favor the production of acid at any given temperature.

The reaction can be run at atmospheric pressure, in a partial vacuum or under induced pressure up to 50–100 p.s.i. Atmospheric pressure is preferred for fixed bed systems and a pressure of 1 to 100 p.s.i. for fluid bed reactions. Operation at a pressure which is below the dew point of the unsaturated acid at the reaction temperature is advantageous.

The examples are intended to illustrate the invention but not to limit it.

A series of runs were made in a fixed bed reactor in a high silica (Vycor) glass tube 14 inches long and 1 inch outside diameter. Outlet vapors were passed through a short water-cooled condenser. Uncondensed gases were passed through a gas chromatograph (Perkin-Elmer Model 154D) and analyzed continuously. The liquid condensate was weighed and then analyzed for acrylic acid and acrolein in the gas chromatograph.

The reactor was charged with 60 ml. of catalyst.

Steam at a temperature of 200–250° C. was first passed into the reactor. Then propylene and air were separately fed into the stream of water vapor. This mixture then passed through a preheater and entered the reactor at about 200–250° C. The reactor was pre-heated to about 285° C. before the gas feed was begun.

The feed ratio of reactants in mols per hour were 0.0795 mol of oxygen (as air), 0.127 mol of water and 0.0317 mol of propylene. Contact time was 18 seconds S.T.P. The $O_2/C_3H_6$ ratio was 2.5 and $H_2O/C_3H_6$ ratio was 4.

The table below sets forth the temperature of reaction and summarizes the data obtained.

TABLE

| | Catalyst | | | | Temperature °C. | Conversion, percent | Yield, percent | | Efficiency, percent | |
|---|---|---|---|---|---|---|---|---|---|---|
| | Ni | Cr | Te | Mo | Si | | | Acrolein | Acrylic acid | Acrolein | Acrylic acid |
| Example: | | | | | | | | | | | |
| 1 | 1 | 1 | 1 | 4 | 2.5 | 425 | 94.99 | 61.48 | 22.97 | 58.40 | 21.82 |
| 2 | 1 | 1 | 2 | 4 | 2.5 | 430 | 66.47 | 83.24 | 10.41 | 55.33 | 6.92 |
| 3 | 4 | 2 | 1 | 5 | ------ | 385 | 83.72 | 35.51 | 33.31 | 27.27 | 27.89 |
| 4 | 4 | 1 | 1 | 6 | ------ | 395 | 89.76 | 39.85 | 34.89 | 35.77 | 31.32 |

NOTE.—In another run as in Example 1, an unsupported catalyst with ½ Te gave a yield of over 40% acrylic acid.

To demonstrate conversion of acrolein to acrylic acid 0.71 liters/hour of acrolein, 2.62 liters/hour of water and 8.35 liters/hour of air were passed over another catalyst prepared as described above and containing in atomic ratio, 2 Ni, 1 Cr, 0.5 Te and 5 Mo as the oxides. Acrolein was converted to acrylic at 380° C. and a contact time of 15.4 seconds in a conversion of 86.5% for a 71.8% yield of acrylic acid. This represents an efficiency of 62.1%.

We claim:

1. A catalyst comprising oxides of nickel, chromium, molybdenum and tellurium in a molar ratio of 0.5 –5 nickel, 0.5–2 chromium, 0.5–4 tellurium and molybdenum in amount that the ratio of nickel to molybdenum is from 0.1 to less than 1.

2. The catalyst composition of claim 1 wherein the molar ratio is 1–4 nickel oxide, 0.5–1 chromium oxide, 0.5–2 tellurium oxide and 4–6 molybdenum oxide.

References Cited

UNITED STATES PATENTS 3,475,348   10/1969   Ziegler et al. _____ 252—439

FOREIGN PATENTS 971,666   9/1964   Great Britain ____ 260—533(N)

PATRICK P. GARVIN, Primary Examiner

U.S. Cl. X.R.

260—533N, 604